(12) United States Patent
Storace

(10) Patent No.: US 6,325,546 B1
(45) Date of Patent: Dec. 4, 2001

(54) FAN ASSEMBLY SUPPORT SYSTEM

(75) Inventor: Albert F. Storace, Cincinnati, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/451,281

(22) Filed: Nov. 30, 1999

(51) Int. Cl.[7] .................................................. F16C 19/00
(52) U.S. Cl. ............................................ 384/536; 384/624
(58) Field of Search .............................. 384/99, 624, 220, 384/222, 215, 536

(56) References Cited

U.S. PATENT DOCUMENTS

| | | | |
|---|---|---|---|
| 4,947,639 | * 8/1990 | Hibner et al. | 384/99 |
| 5,791,789 | 8/1998 | Van Dutn et al. | 384/624 |

OTHER PUBLICATIONS

J. M. Vance et al., "Experimental Evaluation of a Met–L–Flex Bearing Damper in a High Speed Test Rig" Apr. 1997, Turbomachinery Laboratory, Texas A&M University, TRC–RD–5–97.

E.J. Gunter, "Rotor Bearing Stability," Proceedings of the First Turbomachinery Symposium, Texas A&M University, Sep. 13, 1995, pp. 333–335.

* cited by examiner

Primary Examiner—Lenard A. Footland
(74) Attorney, Agent, or Firm—Andrew C. Hess; Nathan D. Herkamp

(57) ABSTRACT

High in-flight vibrations in turbofan gas turbine engines are prevented at windmilling speeds after a blade-out induced structural decoupling of the fan assembly by providing a fan assembly support system with a damper assembly that dissipates vibration energy and retunes the natural frequency of the fan assembly to be above windmilling speeds. The support system includes primary and secondary bearing supports separately secured to the fan frame and a bearing disposed between the primary bearing support and the fan assembly. The damper assembly includes a journal formed on the primary bearing support and a bumper ring attached to the secondary bearing support in surrounding relationship with the journal.

23 Claims, 5 Drawing Sheets

FAN ASSEMBLY SUPPORT SYSTEM

BACKGROUND OF THE INVENTION

This invention relates generally to turbofan gas turbine engines and ore particularly to support systems for the fan assemblies of such engines.

A turbofan gas turbine engine used for powering an aircraft in flight typically includes, in serial flow communication, a fan assembly, a low pressure compressor or booster, a high pressure compressor, a combustor, a high pressure turbine, and a low pressure turbine. The combustor generates combustion gases that are channeled in succession to the high pressure turbine where they are expanded to drive the high pressure turbine, and then to the low pressure turbine where they are further expanded to drive the low pressure turbine. The high pressure turbine is drivingly connected to the high pressure compressor via a first rotor shaft, and the low pressure turbine is drivingly connected to both the fan assembly and the booster via a second rotor shaft.

The fan assembly includes a plurality of circumferentially spaced apart fan blades extending radially outwardly from a rotor disk that is drivingly connected to the low pressure shaft. Each fan blade generally has an airfoil section and an integral dovetail root section that attaches the blade to the rotor disk. The fan assembly is rotatively supported on a nonrotatable frame, commonly referred to as the fan frame, by a support system that typical includes a number of bearings and bearing support structure.

During engine operation, there is a remote possibility that a foreign body, such as a bird, could impact the fan assembly and cause part or all of a fan blade to become detached from the rotor disk. Such a blade loss would create a large imbalance, which could result in the transmission of potentially damaging imbalance forces to the fan frame. To alleviate the transmission of such imbalance forces, it is known to provide the support system with a decoupler, which is a frangible structure designed to fail in response to a predetermined load. Thus, in the event of a blade loss, the unbalanced rotation of the fan assembly will cause the decoupler to fail such what substantial imbalance forces are not transmitted to the fan frame. Accordingly, use of a decoupler effectively reduces the overall weight of the engine because the fan frame and related structure need not be made sufficiently strong to withstand substantial imbalance forces. This structural decoupling will also decrease the natural frequency of the fan assembly.

Although standard procedure is to quickly shut down the engine in the rare event of a blade loss, the fan assembly will continue to rotate due to windmilling caused by the forward motion of the engine. As the fan assembly slows down to the lower windmilling speed, "recoupling" of the fan assembly and the fan frame will occur through the contact load paths between the booster rotor blades and the booster stator and/or between the fan blades and the fan casing. Such recoupling will provide a new transmission path to the fan frame for the imbalance forces, resulting in undesirable engine and/or airframe vibration. This vibration can be particularly troublesome if the depressed natural frequency of the fan assembly is equal to or close to the windmilling speed because of the resulting resonant or slightly off-resonant operation.

Accordingly, there is a need for a fan assembly support system which reduces in-flight engine and airframe vibration at windmilling speeds after a fan blade loss induced structural decoupling of the fan rotor from its support system.

BRIEF SUMMARY OF THE INVENTION

The above-mentioned needs are met by the present invention which provides a support system for rotatively supporting a fan assembly on a fan frame. The support system includes primary and secondary bearing supports separately secured to the fan frame and a bearing disposed between the primary bearing support and the fan assembly. A damper assembly is disposed between the primary bearing support and the secondary bearing support to dissipate vibration energy and retune the natural frequency of the fan assembly to be above windmilling speeds. The damper assembly includes a journal formed on the primary bearing support and a bumper ring attached to the secondary bearing support in surrounding relationship with the journal.

The present invention and its advantages over the prior art will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
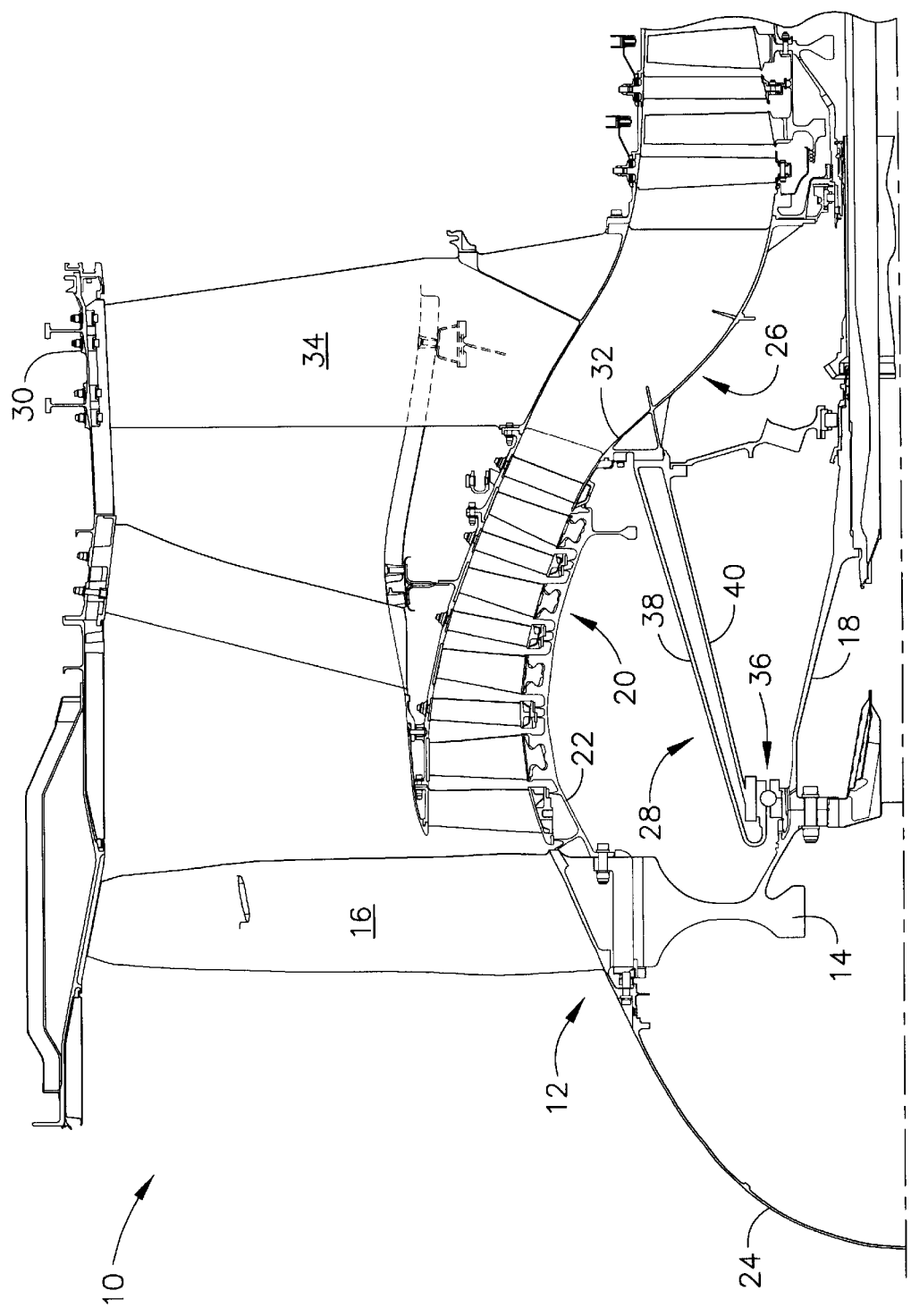
FIG. 1 is a partial, cross-sectional side view of an exemplary turbofan gas turbine engine having the fan assembly support system of the present invention.

Referring to the drawings wherein identical reference numerals denote the same elements throughout the various views, FIG. 1 illustrates a longitudinal cross-sectional view of an exemplary high bypass ratio turbofan engine 10. The engine 10 includes a fan assembly 12 comprising a rotor disk 14, a plurality of cirumferentially spaced apart fan or rotor blades 16 (only one shown in FIG. 1) which extend radially outwardly from the disk 14, and a fan shaft 18 that is powered by a conventional low pressure turbine (not shown). The rotor disk 14 is drivingly connected to the fan shaft 18.

Disposed downstream of the fan assembly 12 is a booster compressor 20 having axially spaced apart vane and blade rows, with the blades thereof being joined to a booster spool or shaft 22. The booster shaft 22 is suitably fixedly joined to the aft side of the rotor disk 14 in a conventional manner. A conical spinner 24 is joined to the forward side of rotor disk 14 to provide an aerodynamic flow path for air entering the fan assembly 12. Other, conventional structures of the engine 10, such as a high pressure compressor, combustor, high pressure turbine, and low pressure turbine are not shown for clarity of illustration.

The fan assembly 12 is rotatively supported on a stationary fan frame 26 by a support system 28. The fan frame 26 includes an annular outer casing 30, an inner hub 32, and a plurality of circumferentially spaced apart struts 34 extending therebetween. The struts 34 are airfoil shaped since bypass air passes between the adjacent ones thereof. The support system 28 includes a bearing 36 and primary and secondary bearing supports 38 and 40, respectively. The bearing 36 is disposed between the fan shaft 18 and the primary bearing support 38, and both the primary bearing support 38 and the secondary bearing support 40 are secured to the inner hub 32.

Figure 2:
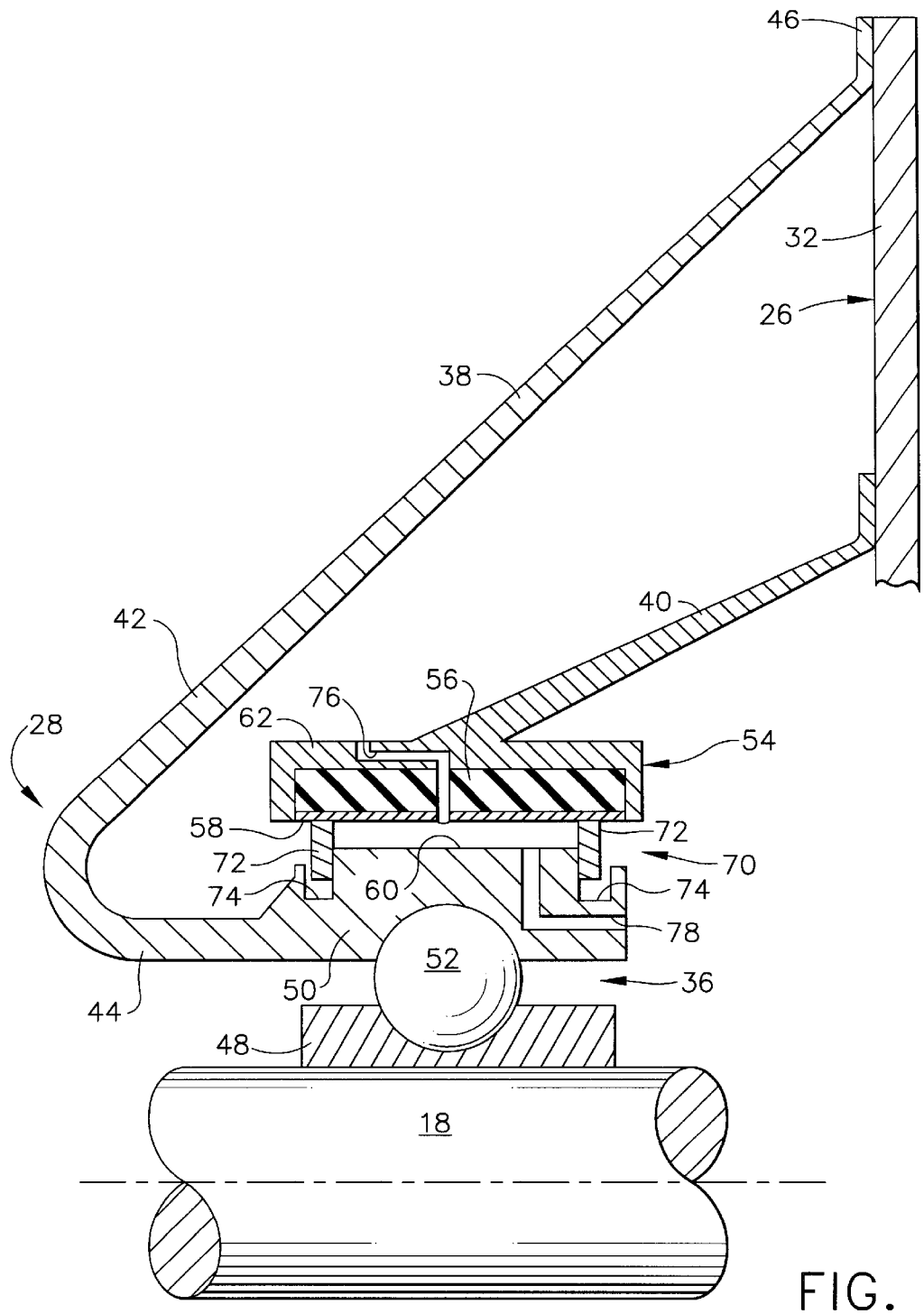
FIG. 2 is an enlarged view of the fan assembly support system of FIG. 1.

Turning to FIG. 2, the support system 28 is shown in more detail. The primary bearing support 38 comprises a hollow conical portion 42 having its tapered end located forward and a central, hollow cylindrical portion 44. The conical portion 42 and the cylindrical portion 44 are joined together at their respective forward ends so that the cylindrical portion 44 extends rearwardly, inside of the conical portion 42. The aft end of the conical portion 42 is secured to the hub 32 of the fan frame 26 via a frangible flange 46 formed thereon. The frangible flange 46 is designed to fail when subjected to a sufficient load, particularly blade-out induced unbalanced loads. The frangible flange 46 thus functions as a fuse or decoupler for structurally decoupling the support system 28 (and thus the fan assembly 12) from the fan frame 26 in response to a blade loss event. It should be understood that the frangible flange 46 is only one possible type of decoupler; the present invention is not limited to a frangible flange, but could use many other types of decouplers to structurally decouple the fan assembly 12 from the fan frame 26 in response to a blade loss event.

The bearing 36 includes an inner race 48 affixed to the fan shaft 18, an outer race 50 formed into the inner surface of the cylindrical portion 44 of the primary bearing support 38, and a plurality of ball bearings 52 disposed between the inner and outer races 48, 50. The secondary bearing support 40 defines a hollow conical body having its tapered end located forward and encircling the cylindrical portion 44 of the primary bearing support 38 and its aft end secured to the hub 32 of the fan frame 26. The secondary bearing support 40 is situated inside of the conical portion 42 of the primary bearing support 38.

Figure 3:
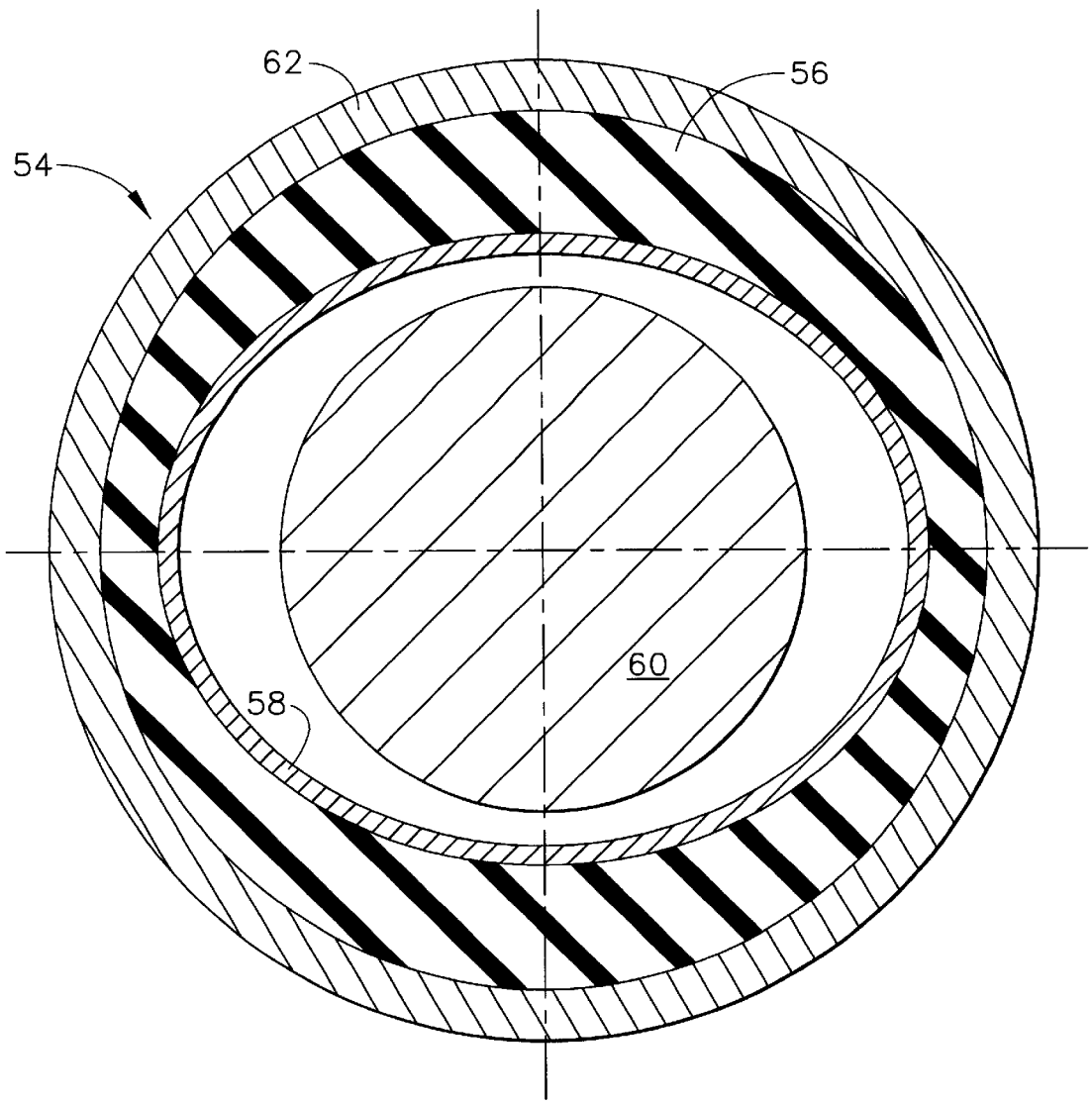
FIG. 3 is a cross-sectional end view of a portion of the fan assembly support system.

The support system 28 further includes a damper assembly 54. As best seen in FIGS. 2 and 3, the damper assembly 54 comprises a compliant damper element or bumper ring 56 defining an elliptical inner surface. It should be pointed out that the present invention is not limited to an elliptical bumper ring 56 having its major axis oriented horizontally as shown in FIG. 3; the major axis can be oriented in any direction. A bearing surface 58 is optionally bonded to the elliptical surface of the bumper ring 56 to provide wear protection thereto. The bumper ring 58 and the bearing surface 58 surround a damper journal 60 formed on the aft end of the cylindrical portion 44 of the primary bearing support 38.

The bumper ring 56 and bearing surface 58 are sized so as to define a large radial clearance with the journal 60. Because the bearing surface 58 is elliptical and the journal 60 is cylindrical, this radial clearance, also referred to as the dead-band, is non-uniform. As will be described more fully below, the large radial clearance prevents interference with the beneficial effects of structural decoupling for running speeds above windmilling speeds. For instance, in large high bypass turbofan engines, the average radial clearance will preferably be in the range of about 25 mm to 38 mm. The damper assembly 54 includes an annular retainer 62 formed on the forward end of the secondary bearing support 40 for holding the bumper ring 56 and the bearing surface 58 in place around the journal 60.

Figure 4:
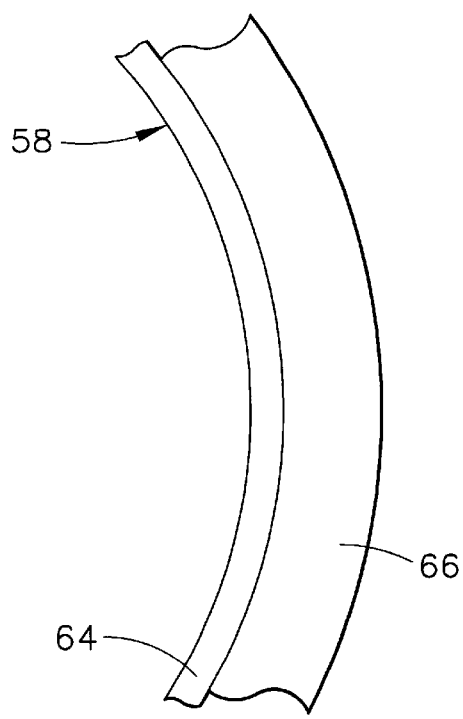
FIG. 4 is a detailed view showing a portion of a first embodiment of a compliant damper element.
Figure 5:
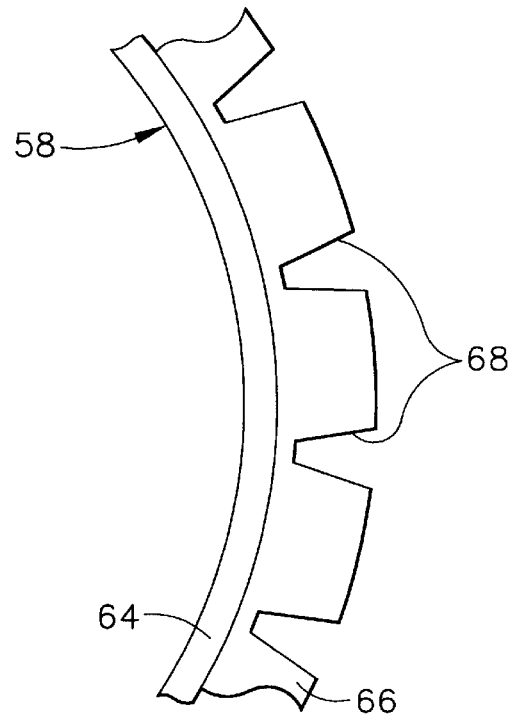
FIG. 5 is a detailed view showing a portion of a second embodiment of a compliant damper element.

As seen in FIGS. 4 and 5, the elliptical bearing surface 58 comprises a thin contact layer 64 of a bearing material such as a tin-based babbitt or a copper-lead alloy bonded on a relatively thicker layer 66 of a compliant and stronger backing material such as bronze. The contact layer 64 preferably possesses self-lubrication properties for minimizing wear. The bronze backing layer 66 is in turn bonded to the inner elliptical surface of the bumper ring 56, which is preferably made of a metal mesh material comprising woven metal strands. Suitable examples of commercially available metal mesh materials that have excellent internal damping properties include steel, copper and aluminum. The bronze backing layer 66 can either be a smooth, continuous layer as shown in FIG. 4 or optionally can have a plurality of slots 68 formed in the back surface thereof as shown in FIG. 5. The slots 68 produce increased compliance and allow for closer coupling between the journal 60 and the metal mesh bumper ring 56.

Referring again to FIG. 2, it is seen that the damper assembly 54 includes a squeeze-film damper element 70 disposed in the large radial clearance between the bearing surface 58 and the damper journal 60. The squeeze-film damper element 70 includes a pair of ring seals 72 extending between the bearing surface 58 and the journal 60. The ring seals 72 are disposed in respective grooves 74 formed near the opposite ends of the journal 60. The squeeze-film damper element 70 shares the lube oil supply from the bearing 36. This oil is fed into the squeeze-film damper element 70 through an oil inlet hole 76 formed in the retainer 62, the bumper ring 56, and the bearing surface 58. An oil outlet passage 78 is provided through the journal 60 to promote cooling thereof. The ring seals 72 prevent excessive oil leakage and do not inhibit axial motion of the journal 60. This avoids the possibility of recoupling at fan speeds above windmilling speeds through radial friction forces. The portions of the journal 60 outboard of the ring seals 72 are cut-back or offset to avoid contact with the retainer 62 and thereby prevent load transmission through the stiff retainer 62. As an alternative to sharing the bearing lube oil supply, a stand-by oil lubrication system, such as an oil pump driven by an electric motor or a solid lubricant such as a powder fed from a canister supply, could be used.

Figure 6:
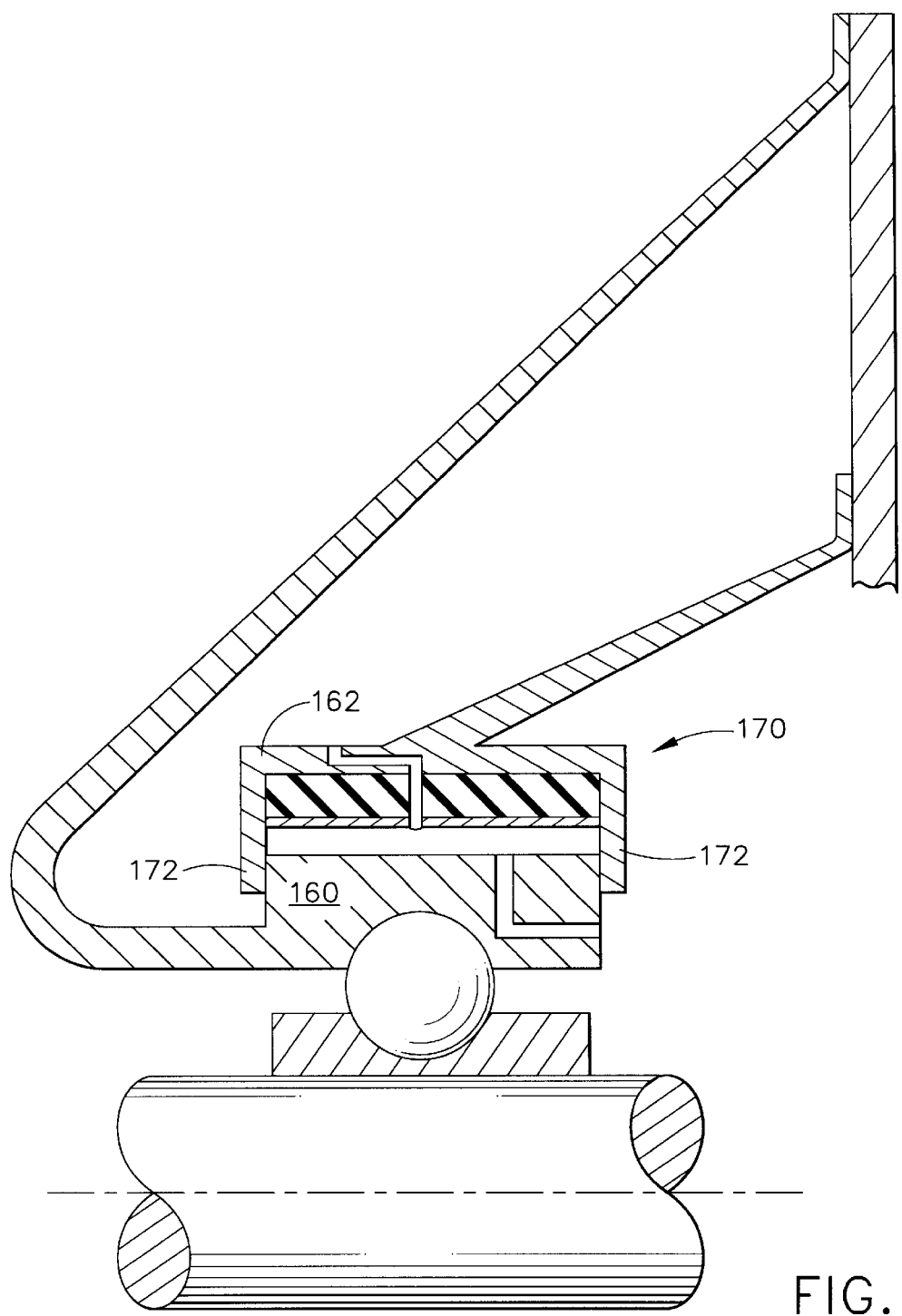
FIG. 6 is a partial, cross-sectional side view of a fan assembly support system according to a second embodiment.

FIG. 6 shows an alternative embodiment of a squeeze-film damper element 170. In this embodiment, the retainer 162 is provided with extended retaining walls 172 that engage the opposing ends of the journal 160 to seal the oil. The embodiment of FIG. 6 is otherwise the same as the embodiment of FIG. 2. In addition to providing a simplified oil sealing configuration, this approach has the advantage of providing positive axial centering of the journal 160 with respect to the retainer 162. However, this embodiment may be more susceptible to recoupling at fan speeds above windmilling speeds through radial friction forces. Another alternative would be to omit a squeeze-film damper element altogether and rely on heat conduction and radiation to dissipate heat generated by the damper assembly.

The damper assembly 54 is inactive during normal engine operation (i.e., while the primary bearing support 38 is structurally coupled to the fan frame 26) as loads are transmitted through the primary bearing support 38. However, the decoupler 46 will fail in the event of a blade out occurrence. Subsequently, the engine 10 will be shut down and the fan assembly 12 will slow down to windmilling speed. At this point, the damper assembly 54 will become activated. The damper assembly 54 is only active at windmilling speeds; the large radial clearance between the bearing surface 58 and the damper journal 60 prevents activation during normal operation and decoupled operation above windmilling speeds.

Upon contact of the bearing surface 58 with the journal 60, the elliptical shape of the bearing surface 58 results in stabilizing anisotropic contact stiffness mainly because of the varying dead-band. This feature prevents dynamic instabilities such as dry friction whip (backward whirl). Furthermore, upon the recoupling that occurs at windmilling speeds, the damper assembly 54 prevents high vibration by retuning the fan assembly's natural frequency to be above the windmilling speed range and by dissipating vibration energy.

Specifically, the natural frequency is raised because the elliptically shaped bumper ring 56 adds stiffness to the system. The corresponding increase in the natural frequency means that resonant or slightly off-resonant operation is avoided because the fan assembly 12 is spinning at windmilling speeds that are now below the critical speed (i.e., the natural frequency). The bumper ring 56 also provides an energy dissipation capability which effectively damps and stabilizes the recoupled system so as to minimize vibration induced by rotor imbalance and to prevent non-synchronous self-excited vibration during windrnilling. It is not expected that the squeeze-film damper element 70 will contribute significant damping because of the large radial clearance between the bearing surface 58 and the damper journal 60. The primary purpose of the squeeze-film damper element 70 is to provide lubrication and cooling to prevent excessive wear and temperature rise during contact between the bearing surface 58 and the journal 60.

The foregoing has described a fan assembly support system that reduces vibrations in turbofan gas turbine engines after a blade-out induced structural decoupling of the fan assembly. While specific embodiments of the present invention have been described, it will be apparent to those skilled in the art that various modifications thereto can be made without departing from the spirit and scope of the invention as defined in the appended claims.

What is claimed is:

1. A support system for rotatively supporting a fan assembly on a fan frame, said support system comprising:
    a primary bearing support secured to said fan frame;
    a bearing disposed between said primary bearing support and said fan assembly;
    a secondary bearing support secured to said fan frame; and
    a damper assembly disposed between said primary bearing support and said secondary bearing support, said damper assembly comprising a journal formed on said primary bearing support and a bumper ring attached to said secondary bearing support in surrounding relationship with said journal.

2. The support system of claim 1 wherein said bumper ring defines an elliptical inner surface.

3. The support system of claim 2 further comprising a bearing surface bonded to said elliptical inner surface.

4. The support system of claim 3 wherein said bearing surface comprises a contact layer and a compliant backing layer.

5. The support system of claim 4 wherein said backing layer has a plurality of slots formed therein.

6. The support system of claim 1 wherein said bumper ring is made of a metal mesh material.

7. The support system of claim 1 wherein said primary bearing support comprises a conical portion and a cylindrical portion joined together at their respective forward ends.

8. The support system of claim 7 wherein said conical portion is secured to said fan frame via a frangible flange formed thereon.

9. The support system of claim 7 wherein said journal is formed on said cylindrical portion.

10. The support system of claim 7 wherein said bearing comprises an inner race affixed to said fan assembly, an outer race formed on said cylindrical portion, and a plurality of ball bearings disposed between said inner and outer races.

11. The support system of claim 1 further comprising a retainer formed on said secondary bearing support, said retainer holding said bumper ring.

12. The support system of claim 1 further comprising a decoupler between said fan assembly and said fan frame.

13. The support system of claim 1 wherein said journal and said bumper ring define a clearance therebetween.

14. The support system of claim 1 wherein said damper assembly further includes a squeeze-film damper element.

15. A support system for rotatively supporting a fan assembly on a fan frame, said support system comprising:
    a primary bearing support comprising a conical portion and a cylindrical portion joined together at their respective forward ends, said conical portion having a frangible flange formed on its aft end, said frangible flange being secured to said fan frame;
    a bearing disposed between said primary bearing support and said fan assembly;
    a secondary bearing support comprising a conical body situated inside of said conical portion of said primary bearing support and having a forward end and an aft end, said aft end of said secondary bearing support being secured to said fan frame; and
    a damper assembly disposed between said primary bearing support and said secondary bearing support, said damper assembly comprising a journal formed on said cylindrical portion of said primary bearing support and a bumper ring having an elliptical inner surface attached to said forward end of said secondary bearing support in surrounding relationship with said journal.

16. The support system of claim 15 further comprising a bearing surface bonded to said elliptical inner surface.

17. The support system of claim 16 wherein said bearing surface comprises a contact layer and a compliant backing layer.

18. The support system of claim 17 wherein said backing layer has a plurality of slots formed therein.

19. The support system of claim 15 wherein said bumper ring is made of a metal mesh material.

20. The support system of claim 15 wherein said bearing comprises an inner race affixed to said fan assembly, an outer race formed on said cylindrical portion, and a plurality of ball bearings disposed between said inner and outer races.

21. The support system of claim 15 further comprising a retainer formed on said secondary bearing support, said retainer holding said bumper ring.

22. The support system of claim 15 wherein said journal and said bumper ring define a clearance therebetween.

23. The support system of claim 15 wherein said damper assembly further includes a squeeze-film damper element.

* * * * *